United States Patent
Diebold et al.

(10) Patent No.: US 9,463,933 B2
(45) Date of Patent: Oct. 11, 2016

(54) HYDRAULIC DRIVE SYSTEM AND METHOD FOR DRIVING A BELT CONVEYOR

(71) Applicant: Putzmeister Engineering GmbH, Aichtal (DE)

(72) Inventors: Martin Diebold, Reutlingen (DE);
Martin Mayer, Reutlingen (DE);
Werner Münzenmaier, Nürtingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 14/669,652

(22) Filed: Mar. 26, 2015

(65) Prior Publication Data

US 2015/0197398 A1   Jul. 16, 2015

Related U.S. Application Data

(63) Continuation of application No. PCT/EP2013/070961, filed on Oct. 8, 2013.

(30) Foreign Application Priority Data

Oct. 11, 2012   (DE) ........................ 10 2012 218 546

(51) Int. Cl.
*F16H 39/00* (2006.01)
*B65G 23/22* (2006.01)
(Continued)

(52) U.S. Cl.
CPC .............. *B65G 23/00* (2013.01); *B65G 15/28* (2013.01); *F15B 11/0423* (2013.01); *F16H 61/4131* (2013.01); *F16H 61/431* (2013.01)

(58) Field of Classification Search
CPC ........ B65G 23/22; F16H 39/00; F16H 61/42

USPC ...... 60/445, 446, 447, 452; 198/781.06, 832
See application file for complete search history.

(56) References Cited

U.S. PATENT DOCUMENTS 3,500,990 A * 3/1970 Kamman ............... B65G 23/00
198/686
3,800,935 A * 4/1974 Montgomery ....... B22D 33/005
198/572

(Continued)

FOREIGN PATENT DOCUMENTS

DE          198 14 536 A1   10/1999
DE   10 2009 002 849 A1    1/2010

(Continued)

OTHER PUBLICATIONS

English Translation of International Preliminary Report on Patentability and Written Opinion of the International Searching Authority, PCT/EP2013/070961, Apr. 14, 2015.

*Primary Examiner* — Douglas Hess
(74) *Attorney, Agent, or Firm* — Bose McKinney & Evans LLP

(57) ABSTRACT

The invention relates to a hydraulic drive system for a belt conveyor with a motor-driven primary pump which is arranged in a hydraulic primary circuit and is intended for conveying hydraulic fluid, a hydraulic motor which is supplied with hydraulic fluid via the primary circuit and is intended for driving the belt conveyor, and a control device which influences the flow of hydraulic fluid in the primary circuit and is intended for controlling the belt speed of the belt conveyor. In exemplary embodiments, the primary pump is a variable displacement pump and has a pump regulator for regulating the conveyed flow of hydraulic fluid, and the control device comprises a hydraulic control circuit, which is operated by means of an auxiliary pump, for subjecting the pump regulator to an adjustable actuating pressure.

18 Claims, 1 Drawing Sheet

(51) Int. Cl.
*B65G 23/00* (2006.01)
*F16H 61/4131* (2010.01)
*F16H 61/431* (2010.01)
*B65G 15/28* (2006.01)
*F15B 11/042* (2006.01)

(56) References Cited

U.S. PATENT DOCUMENTS

| | | | |
|---|---|---|---|
| 3,929,219 A * | 12/1975 | Malcolm | B65G 69/0408 198/571 |
| 4,047,452 A * | 9/1977 | Eddy | B65G 23/26 198/832.2 |
| 4,112,999 A * | 9/1978 | Gasper | B22D 33/005 164/154.6 |
| 4,168,611 A * | 9/1979 | Woyton | H02P 29/0022 198/502.4 |
| 4,337,611 A * | 7/1982 | Mailander | A01D 41/1274 460/6 |
| 4,343,060 A * | 8/1982 | Hildebrand | E01H 1/047 15/84 |
| 4,559,778 A | 12/1985 | Krusche | |
| 4,821,936 A * | 4/1989 | Osborn | F04B 1/324 226/120 |
| 5,184,466 A | 2/1993 | Schniederjan et al. | |
| 5,584,640 A * | 12/1996 | Johnson | A01D 69/03 198/572 |
| 5,873,227 A * | 2/1999 | Arner | A01F 12/56 56/10.2 G |
| 5,901,535 A * | 5/1999 | Duckinghaus | A01F 29/14 144/242.1 |
| H1977 H * | 8/2001 | Poorman | |
| 6,755,296 B2 * | 6/2004 | Elwell | B64F 1/32 198/301 |
| 7,140,169 B2 * | 11/2006 | Ameye | A01F 29/14 56/10.2 J |
| 7,464,525 B2 * | 12/2008 | Dueckinghaus | F16H 61/4043 56/10.2 J |
| 8,869,522 B2 * | 10/2014 | Bohrer | A01D 41/1274 56/10.2 J |
| 9,131,640 B2 * | 9/2015 | Brockmann | A01D 75/18 |
| 2001/0042763 A1 | 11/2001 | Malone et al. | |
| 2012/0067037 A1 | 3/2012 | Bohrer et al. | |
| 2015/0247294 A1* | 9/2015 | Weiler et al. | |
| 2016/0060828 A1* | 3/2016 | Killion et al. | |

FOREIGN PATENT DOCUMENTS

EP 0 477 510 A2 4/1992
JP 2008-168992 A 7/2008

* cited by examiner

HYDRAULIC DRIVE SYSTEM AND METHOD FOR DRIVING A BELT CONVEYOR

RELATED APPLICATIONS

This application is a continuation of PCT/EP2013/070961, filed Oct. 8, 2013, which claims priority to DE 10 2012 218 546.1, filed Oct. 11, 2012, both of which are hereby incorporated herein by reference in their entireties.

BACKGROUND

The invention relates to a hydraulic drive system and to a method for driving a belt conveyor, in particular, on a mobile conveying appliance.

DE-A 19814536 discloses a mobile conveying appliance with a belt conveyor for bulk material, thick matter and suchlike conveyable stock. Such conveying appliances are sold by the applicant with a hydraulic drive for the belt conveyor. In the previous belt drive, the required hydraulic oil quantity is controlled via a proportional valve which is arranged in the main circuit between the hydraulic pump and the hydraulic motor. As a result, the entire oil stream is conducted through this valve, thus leading to flow losses. Moreover, a control block is required, which is suitable for this oil quantity and which is therefore produced as a separate part.

SUMMARY

The present invention improves the known device for the drive control of a belt conveyor and specifies a drive system and drive method, whereby energy losses during the belt drive are reduced and a reliable check of belt transport can be achieved without complicated separate components.

The solution according to this disclosure lies essentially in directly controlling the primary pump via an additional hydraulic control circuit having standard components. Consequently, with regard to a drive system, it is proposed that the primary pump, as a variable displacement pump, includes a pump regulator as an actuating member for regulating the conveyed hydraulic fluid stream, and that the control device has a hydraulic control circuit, operated by means of an auxiliary pump, for acting upon the pump regulator with an adjustable actuating pressure. Sensitive control and efficient operation of the primary hydraulic circuit are thereby possible, without complicated fittings or valves being required in order to influence large oil streams.

Advantageously, the primary pump is directly connected, free of valves, to the hydraulic motor on the delivery side via a delivery line of the primary circuit, so that the energy losses are minimized.

A further preferred refinement of this disclosure provides for the primary pump to be arranged in a closed primary circuit, the hydraulic motor being directly connected on the outlet side to the suction inlet of the primary pump via a return line. In this way, the required oil volume in the reservoir or tank can also be kept low.

In order to ensure fault-free operation even in the case of a variable rotational speed of the drive motor, it is advantageous if a pressure limiting valve to safeguard the primary circuit against excess pressure is arranged in a branch line branching off from the delivery side of the primary pump.

With a view to an improved service life of the primary pump, too, it is advantageous if the suction inlet of a primary pump is connected to a pressureless reservoir for hydraulic fluid via a supply line, and if the nonreturn valve pressurized in the direction toward the primary pump is arranged in the supply line.

Particularly for a mobile conveying appliance, it is beneficial if the primary pump is driven, if appropriate at a variable rotational speed, via a motor of the conveying appliance, in particular an electric motor or an internal combustion engine. A further advantageous possibility for use arises in that the hydraulic motor has an output coupled to a drive roller of an, in particular, telescopic conveyor belt of the belt conveyor.

According to a preferred refinement of this disclosure, the auxiliary pump, designed as a fixed displacement pump, is motor-driven, together with the primary pump, via a common drive train, so that only one drive source is required.

To provide a defined system pressure in the control circuit even in the case of a variable motor rotational speed, it is advantageous if the control circuit has a pressure limiting valve for the defined limitation of the outlet pressure of the auxiliary pump. To reduce the tank oil quantity required, it is also beneficial if the pressure limiting valve is arranged in a connecting line between the delivery outlet of the auxiliary pump and the suction inlet of the primary pump.

For operator-friendly, if appropriate continuous regulation of the belt speed, it is advantageous if the control circuit has a proportional valve, activatable according to a desired value instruction via an electrical control unit, for setting the actuating pressure on the pump regulator. In this respect, it is also advantageous if the auxiliary pump is connected on the delivery side via a control line to the pump regulator of the primary pump, and if the proportional valve is arranged in a branch line branching off from the control line and leading to a tank.

In order to allow emergency operation, too, it is beneficial if the proportional valve has an actuating member for manual adjustment for emergency operation.

To supply a constant hydraulic fluid stream in the control circuit, it is advantageous if the control circuit has a permanently set throttle following the delivery outlet of the auxiliary pump.

A further advantageous refinement provides for the pump regulator to comprise a spring-supported actuating cylinder, capable of being acted upon with hydraulic fluid via the control circuit, for the adjustment of a swashplate of the primary pump.

A further aspect of this disclosure lies in a mobile conveying appliance with a belt conveyor and with a hydraulic drive system according to this disclosure.

In terms of the method, the advantage initially mentioned is achieved in that the conveying stream is influenced via a pump regulator of the primary pump designed as a variable displacement pump, and in that an actuating pressure is applied to the pump regulator via hydraulic control circuit operated by means of an auxiliary pump and separate from the primary circuit.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
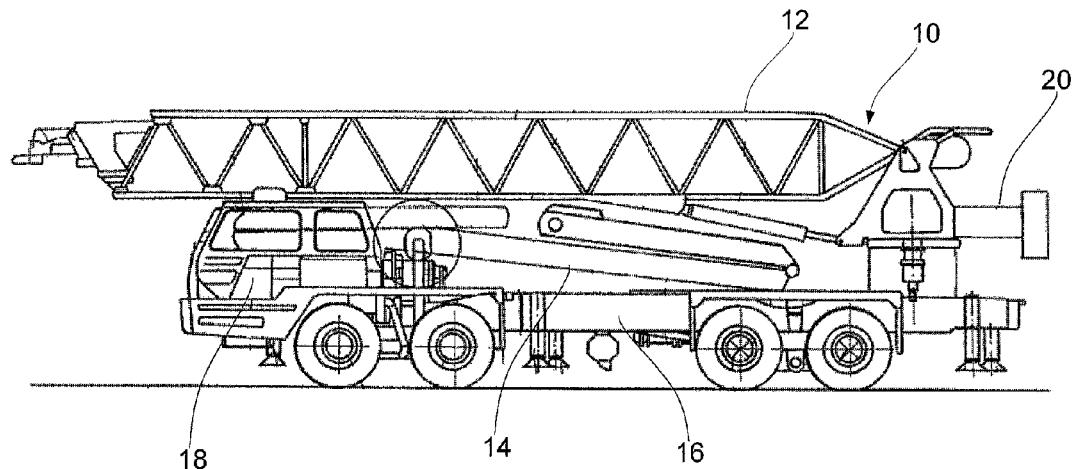
FIG. 1 shows a side view of a mobile conveying appliance with a hydraulically driven belt conveyor.

The conveying appliance 10, shown in the traveling state in FIG. 1, comprises a telescopic main belt conveyor 12, a supply belt conveyor 14, an undercarriage 16 with a driver's cab 18 and an energy-efficient hydraulic drive system 20 for the belt conveyor 12, by means of which drive system the belt speed of a revolving conveyor belt transporting the conveyable stock can be regulated continuously. For details of the conveying appliance 10, reference is made to DE-A 198 14536.

Figure 2:
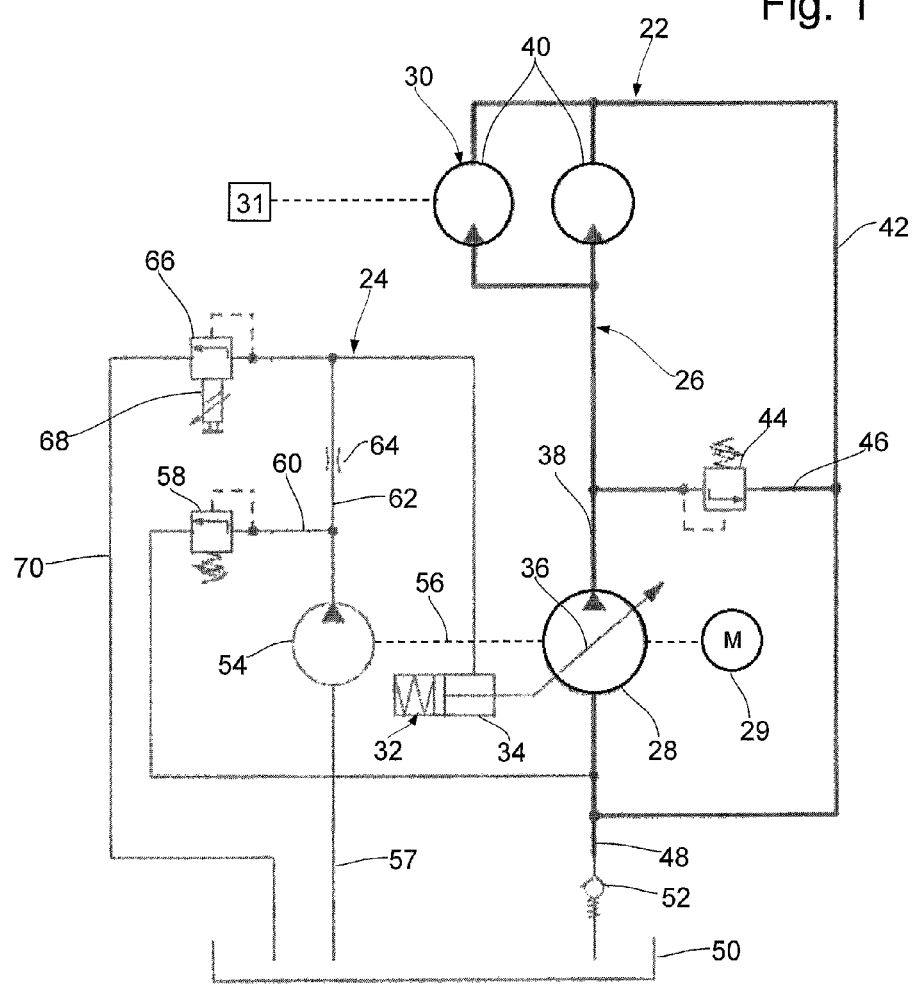
FIG. 2 shows a circuit diagram of a hydraulic drive system for the belt conveyor.

In the circuit diagram of the drive system 20 according to FIG. 2, hydraulic drive switching 22 is illustrated by thick lines and a control device, separate from this, in the form of hydraulic control circuit 24 is illustrated by thin lines.

The drive switching 22 has a closed hydraulic primary circuit 26, in which are arranged a primary pump 28 for the circulation of hydraulic oil and a hydraulic motor 30 for driving the conveyor belt of the belt conveyor 12.

The primary pump 28, driven by means of a diesel engine 29, is designed as a variable displacement pump, for example as a swashplate pump, and has a pump regulator 32 as an actuating member for regulating the conveyed hydraulic oil stream. The pump regulator 32 comprises a spring-supported actuating cylinder 34 which can be acted upon with hydraulic oil via the control circuit 24 and which correspondingly changes the angle of inclination of a swashplate 36 of the primary pump 28.

The primary pump 28 is directly connected, free of valves, on the delivery side to the inlet side of the hydraulic motor 30 via a delivery line 38 of the primary circuit 26. In the exemplary embodiment shown, said hydraulic motor is composed of two individual motors 40 which are arranged parallel to one another in the primary circuit 26 and are connected on the outlet side to the suction inlet of the primary pump 28 via a common return line 42. As indicated merely diagrammatically in FIG. 2, the hydraulic motor 30 has an output coupled to a drive roller 31 of a conveyor belt of the belt conveyor 12.

To safeguard the primary circuit 26 against excess pressure, a pressure limiting valve 44 is arranged in a branch line 46 which leads from the delivery line 38 to the return line 42. Downstream of the point of issue of the branch line 46, the primary circuit 26 is connected via a supply line 48 to a pressureless oil tank 50. In order to obtain pressurization on the suction side of the primary pump 28, a nonreturn valve 52 spring-tensioned in the direction toward the primary pump 28 is arranged in the supply line 48.

The control circuit 24 is operated by means of an auxiliary pump 54 which is driven via a throughput 56 of the drive train of the primary pump 28 and which, as a fixed displacement pump, conveys a relatively small oil quantity. In this case, the auxiliary pump 54 is connected to the tank 50 via a suction line 57.

In order to provide a defined outlet pressure largely independently of the rotational speed of the engine 29, the control circuit 24 comprises a pressure limiting valve 58 in a connecting line 60 which branches off from the delivery outlet of the auxiliary pump 54 and which issues into the suction inlet of the primary pump 28.

In order to provide an actuating pressure on the pump regulator 32, the delivery outlet of the auxiliary pump 54 is connected to the actuating cylinder 34 via a control line 62. To supply a constant oil stream, a fixed throttle 64 is arranged in the control line 62. The instruction of a desired value for the actuating pressure is made possible via a proportional valve 66 which can be set via an electrical activating unit 68 and which, if appropriate, can be operated manually for emergency operation. This proportional valve 66 is arranged in a branch line 70 which branches off, downstream of the fixed throttle 64, from the control line and leads to the tank 50.

During operation, the diesel engine 29 drives the primary pump 28 at a rotational speed which is variable within certain limits, the pressure safeguard of the primary circuit 26 being ensured by the pressure limiting valve 44. The pressure oil is fed directly, without valves, into the hydraulic motor 30 from the delivery side of the primary pump 28, so that a low-loss drive is achieved.

The control of the oil quantity in the circuit 26 and therefore of the belt speed of the belt conveyor 12 is implemented via the separate control circuit 24. For this purpose, the auxiliary pump 54 is likewise driven, via the throughput 56 of the primary pump 28, by the engine 29, only a relatively small control oil stream being required. By means of the pressure limiting valve 58, the maximum system pressure is set, which lies markedly below the pressure in the primary circuit 26. Excess oil is fed in on the suction side of the primary pump 28, so that the required tank oil quantity is reduced. Together with the oil flowing back from the hydraulic motor 30, an excess oil quantity arises on the suction side of the primary pump 28, as a result of which its service life is improved. In order to limit the pressurization on the suction side of the pump, if appropriate, excess oil is conducted to the tank 50 via the nonreturn valve 52. Oil exchange in the primary circuit 26 is thus also ensured.

The fixed throttle 64 downstream of the branch-off of the pressure limiting valve 58 ensures a constant oil stream to the control or proportional valve 66 and to the pump regulator 32 even in the case of a varying diesel rotational speed. By means of the relatively small proportional valve 66, produced as a standard component, the actuating pressure upon the pump regulator can be set continuously. The pivot angle of the primary pump 28 and therefore the belt speed are regulated correspondingly. For emergency actuation, manual adjustment of the proportional valve 66 is also possible.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A hydraulic drive system for a belt conveyor of the type used on a mobile conveying appliance, the drive system comprising:

a motor-driven primary pump arranged in a hydraulic primary circuit for conveying hydraulic fluid, the primary pump being a variable displacement pump having a pump regulator for regulating the conveyed hydraulic fluid stream;

a hydraulic motor supplied with hydraulic fluid via the primary circuit for driving the belt conveyor; and a controller configured to control the belt speed of the conveyor by influencing the hydraulic fluid stream in the primary circuit, the controller comprising a hydraulic control circuit operated by an auxiliary pump that acts upon the pump regulator with an adjustable actuating pressure to thereby influence the hydraulic fluid stream in the primary circuit and control the belt speed of the conveyor.

2. The drive system as claimed in claim 1, wherein the primary pump is directly connected, free of valves, on the delivery side to the hydraulic motor via a delivery line of the primary circuit.

3. The drive system as claimed in claim 1, wherein the primary circuit is closed and the primary pump is arranged in the primary circuit, the hydraulic motor being directly connected on the outlet side to the suction inlet of the primary pump via a return line.

4. The drive system as claimed in claim 1, wherein a pressure limiting valve for safeguarding the primary circuit against excess pressure is arranged in a branch line branching off from the delivery side of the primary pump.

5. The drive system as claimed in claim 1, wherein the suction inlet of the primary pump is connected via a supply line to a pressureless reservoir for hydraulic fluid and a nonreturn valve pressurized in the direction toward the primary pump is arranged in the supply line.

6. The drive system as claimed in claim 1, wherein the primary pump is driven at a variable rotational speed via a motor of the conveying appliance.

7. The drive system as claimed in claim 6, wherein the motor comprises an electric motor or an internal combustion engine.

8. The drive system as claimed in claim 1, wherein the hydraulic motor has an output coupled to a drive roller of a conveyor belt of the belt conveyor.

9. The drive system as claimed in claim 1, wherein the auxiliary pump comprises a fixed displacement pump and is motor-driven, together with the primary pump, via a common drive train.

10. The drive system as claimed in claim 1, wherein the control circuit has a pressure limiting valve for the defined limitation of the outlet pressure of the auxiliary pump, and wherein the pressure limiting valve is arranged in a connecting line between the delivery outlet of the auxiliary pump and the suction inlet of the primary pump.

11. The drive system as claimed in claim 1, wherein the control circuit has a proportional valve, activatable according to a desired value instruction via an electrical control unit, for setting the actuating pressure on the pump regulator.

12. The drive system as claimed in claim 11, wherein the auxiliary pump is connected on a delivery side of the auxiliary pump to the pump regulator of the primary pump via a control line, and the proportional valve is arranged in a branch line branching off from the control line and leading to a reservoir.

13. The drive system as claimed in claim 11, wherein the proportional valve has an actuating member for manual adjustment for emergency operation.

14. The drive system as claimed in claim 1, wherein the control circuit has a permanently set throttle following the delivery outlet of the auxiliary pump for supplying a constant hydraulic fluid stream.

15. The drive system as claimed in claim 1, wherein the pump regulator comprises a spring-supported actuating cylinder capable of being acted upon with hydraulic fluid via the control circuit for adjusting a swashplate of the primary pump.

16. A mobile conveying appliance having a belt conveyor and a hydraulic drive system as claimed in claim 1.

17. The drive system as claimed in claim 1, wherein the belt speed of the conveyor is controlled solely by adjustment of the actuating pressure acting upon the pump regulator.

18. A method for driving a belt conveyor of the type used on a mobile conveying appliance, the method comprising the following steps:

conveying hydraulic fluid in a hydraulic primary circuit with a motor-driven primary pump, the primary pump being a variable displacement pump;

supplying hydraulic fluid to a hydraulic motor that drives the belt conveyor via the primary circuit;

controlling the belt speed of the belt conveyor by influencing the conveying stream in the primary circuit, wherein the influencing of the conveying stream is via a pump regulator of the primary pump; and applying an actuating pressure to a pump regulator via a hydraulic control circuit operated by means of an auxiliary pump, the hydraulic control circuit being separate from the primary circuit.

* * * * *